US007614799B2

(12) United States Patent
Bradley et al.

(10) Patent No.: US 7,614,799 B2
(45) Date of Patent: Nov. 10, 2009

(54) HARDENED CONNECTOR SYSTEM INCLUDING A TRANSLATOR

(75) Inventors: Kelvin B Bradley, Lawrenceville, GA (US); John L Siereveld, Marietta, GA (US); Willard C White, Suwanee, GA (US)

(73) Assignee: OFS Fitel, LLC, Norcross, GA (US)

( * ) Notice: Subject to any disclaimer, the term of this patent is extended or adjusted under 35 U.S.C. 154(b) by 0 days.

(21) Appl. No.: 11/836,824

(22) Filed: Aug. 10, 2007

(65) Prior Publication Data

US 2008/0273855 A1 Nov. 6, 2008

Related U.S. Application Data

(60) Provisional application No. 60/927,409, filed on May 3, 2007.

(51) Int. Cl.
*G02B 6/36* (2006.01)
(52) U.S. Cl. .......................................... 385/77; 385/84
(58) Field of Classification Search ................... 385/85, 385/77, 84
See application file for complete search history.

(56) References Cited

U.S. PATENT DOCUMENTS

| 7,044,650 | B1 | 5/2006 | Tran et al. |
| 7,090,406 | B2 | 8/2006 | Melton et al. |
| 7,120,347 | B2 | 10/2006 | Blackwell, Jr. et al. |
| 7,150,567 | B1 | 12/2006 | Luther et al. |

*Primary Examiner*—Jerry T Rahll

(57) ABSTRACT

Embodiments of the invention include a hardened connector system. The connector system includes a connector plug for terminating an optical fiber, a plug housing for coupling to the optical fiber cable and the connector plug, and a translator for coupling the plug housing and the connector plug to an optical fiber connector adapter. The translator, which couples the plug housing to a jack receptacle portion of the connector adapter is configured to allow the connector to be decoupled from the connector adapter without damaging the connector adapter, e.g., when the connector system is subjected to relatively excessive cable loads. Also, the dimensions and configuration of the plug housing allow it to be pulled through conventional conduit, including a 90°-bent, 0.75 inch Schedule 40 conduit.

12 Claims, 5 Drawing Sheets

HARDENED CONNECTOR SYSTEM INCLUDING A TRANSLATOR

CROSS-REFERENCE TO RELATED APPLICATION

This application claims priority to the filing date of a U.S. provisional patent application having Ser. No. 60/927,409, entitled "HARDENED CONNECTOR FOR OUTSIDE PLANT APPLICATIONS", filed on May 3, 2007, which is incorporated herein by reference in its entirety.

BACKGROUND OF THE INVENTION

1. Field of Invention

The invention relates to connectors, such as connectors for use with optical fibers. More particularly, the invention relates to hardened connector systems, such as connectors used in outside plant applications.

2. Description of Related Art

Network providers and customers often need factory terminated, environmentally-sealed, hardened connectors and adapters for use in drop-cable deployments in optical access networks. Also, network providers and customers often desire products that significantly reduce terminal and drop cable installation times and total deployment cost. The connectors and adapters that are used should be hardened to protect against extreme temperature, moisture, chemical exposure, and other harsh conditions typically found in outside plant environments.

Hardened connectors typically are used to connect multi-port terminals or fiber terminal closures, which usually are located at the street (e.g., in aerial configurations or in below-ground hand holes), to Optical Network Terminals (ONTs), which usually are located at end user premises. During build-out, the connector system typically is mated to the external surface of the fiber terminal, so that connections can be completed without opening the enclosure, thus essentially creating a "plug and play" connection. When hardened connectors are deployed in a Multi-Dwelling Unit (MDU) application, the hardened connectors typically are fed into holes drilled into the exterior wall of a building. Such holes typically are approximately 0.50 of an inch in diameter.

Several connector manufacturers and vendors offer hardened connectors and associated adapters for various applications, including Fiber to the x (FTTx) applications, such as Fiber to the Premises (FTTP) or Fiber To The Home (FTTH) applications. See, e.g., U.S. Pat. No. 7,090,406 and U.S. Pat. No. 7,150,567. Such connectors consist of an SC Connector plug enclosed in a pronged plug housing, fitted with two silicone O-rings. Upon insertion of the connector into the adapter (e.g., the adapter shown in U.S. Pat. No. 7,044,650), the O-rings are compressed against smooth walls within the adapter, to provide a water tight seal between the connector and adapter housing. The adapter uses a silicone O-ring to provide a water-tight seal against a panel or enclosure wall. Cable retention is achieved by sandwiching and bonding the cable's strength members within a two-piece crimp body and then crimping a metal crimp band into place over the crimp body. Heat-shrink tubing is used over the cable at the rear of the connector to prevent water from entering the plug housing.

Such connectors are among the most popular connectors currently available. However, the outside diameter of such connectors typically is approximately 0.80 of an inch, which can not be pulled through a 90° bend in 0.75 inch American National Standards Institute (ANSI) Schedule 40 conduit. Similarly, such connectors can not be inserted through the 0.50 of an inch diameter holes drilled in building walls, e.g., in MDU applications. Also, such connectors typically have a threaded coupling nut, which takes a relatively long time to screw into place compared to other alternatives, such as a push-pull configuration. Also, when such connectors are subjected to relatively excessive cable loads, e.g., due to ice build up on aerial cables, the connectors sometimes can separate from their corresponding adapters in a manner that permanently damages the adapters, thus requiring the entire adapter to be replaced. Since the adapters typically are permanently pre-installed in the fiber terminals during the manufacture of the fiber terminals (to ensure a water tight seal), the entire terminal often has to be replaced in such case.

Accordingly, it would be desirable to have available a hardened connector system that addresses and overcomes the aforementioned issues associated with many conventional hardened connectors and connector systems.

SUMMARY OF THE INVENTION

The invention is embodied in a hardened connector system. The hardened connector system includes a connector plug for terminating an optical fiber, a plug housing for coupling to the optical fiber cable and the connector plug, and a translator for coupling the plug housing and the connector plug to an optical fiber connector adapter. The translator, which has a first end for coupling to the plug housing and a second end for coupling to a jack receptacle portion of the optical fiber connector adapter, couples the plug housing to the optical fiber connector adapter in a way that operably positions the connector plug within the optical fiber connector adapter. Also, the translator is configured in a way that allows the connector, e.g., the connector plug housing and connector plug, to be decoupled from the connector adapter without damaging the connector adapter, e.g., when the connector system is subjected to relatively excessive cable loads. Also, the dimensions and configuration of the plug housing allow it to be pulled through conventional conduit, including a 90° bend in 0.75 inch Schedule 40 conduit.

DETAILED DESCRIPTION OF EXEMPLARY EMBODIMENTS

Figure 1:
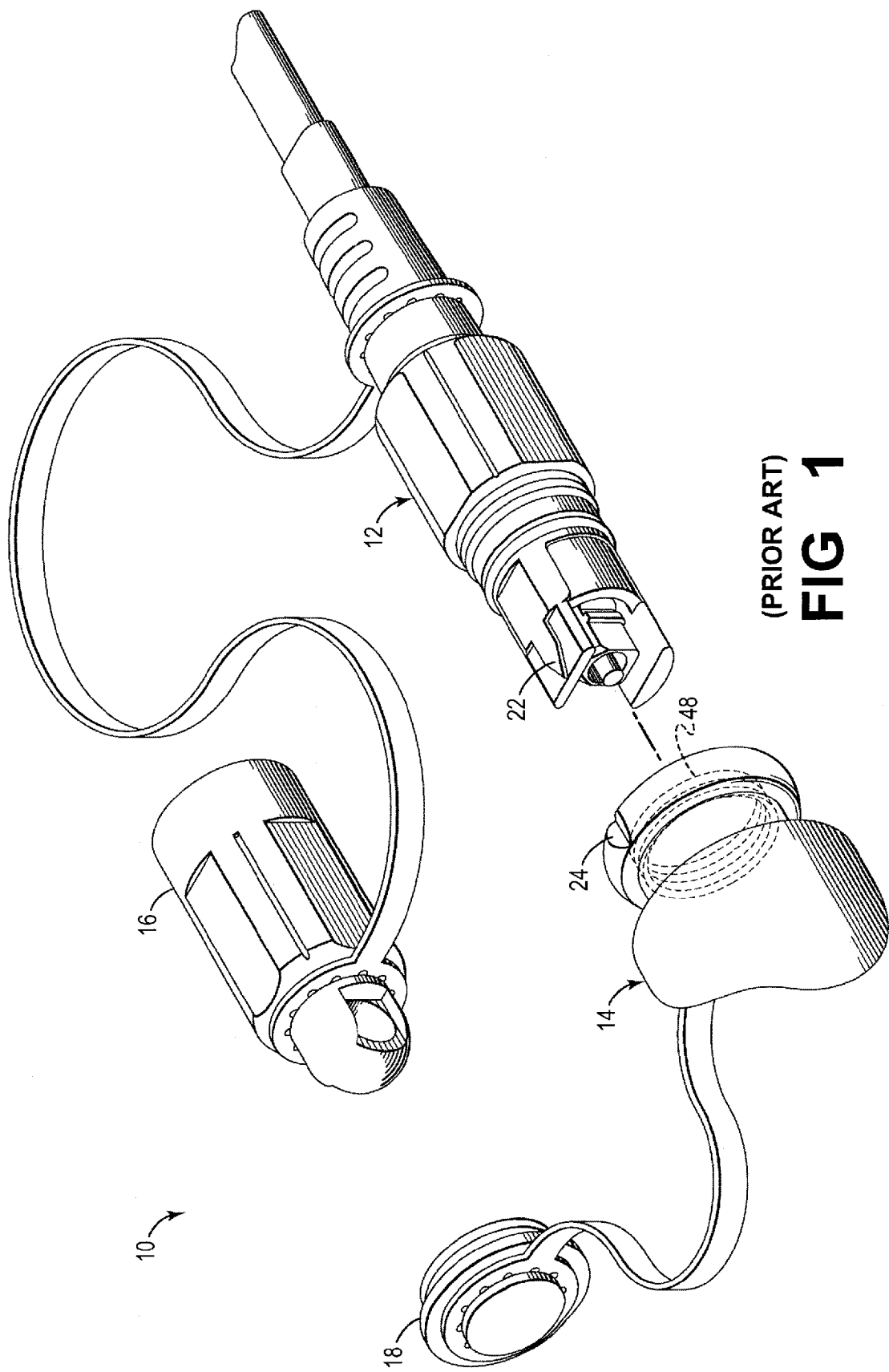
FIG. 1 is a simplified, perspective view of a conventional hardened optical connector system.

In the following description like reference numerals indicate like components to enhance the understanding of the invention through the description of the drawings. Also, although specific features, configurations and arrangements are discussed hereinbelow, it should be understood that such is done for illustrative purposes only. A person skilled in the relevant art will recognize that other steps, configurations and arrangements are useful without departing from the spirit and scope of the invention.

Referring now to FIG. 1, shown is a simplified, perspective view of a conventional hardened optical connector system 10, in which a first optical fiber connector or connector plug 12 is to be interconnected to a second optical fiber connector or other appropriate optical component (not shown) via an adapter (not shown). The adapter, which typically is pre-installed in a fiber terminal in many hardened connector system arrangements, typically is formed by a jack receptacle 14 placed back to back with a behind-the-wall receptacle (not shown) designed to accept a non-hardened, behind-the-wall version of the optical connector. The connector 12 can have a protective dust cap 16 that is removable to allow the connector to be inserted into the jack receptacle 14. The jack receptacle 14 also can have a protective dust cap 18 that is removable to allow the connector 12 to be inserted in the jack receptacle 14.

The conventional hardened optical connector 12 can include a key 22 or other alignment indicia, and the jack receptacle 14 can include a complementary or mating keyway 24 or other suitable complementary alignment indicia. Accordingly, when the connector 12 is inserted into the jack receptacle 14, the key 22 and the mating keyway 24 properly orient the connector 12 with respect to jack receptacle 14. The key 22 also prevents the connector 12 from being inserted into a jack receptacle that does not have the appropriate complementary or mating keyway formed therein.

Figure 2:
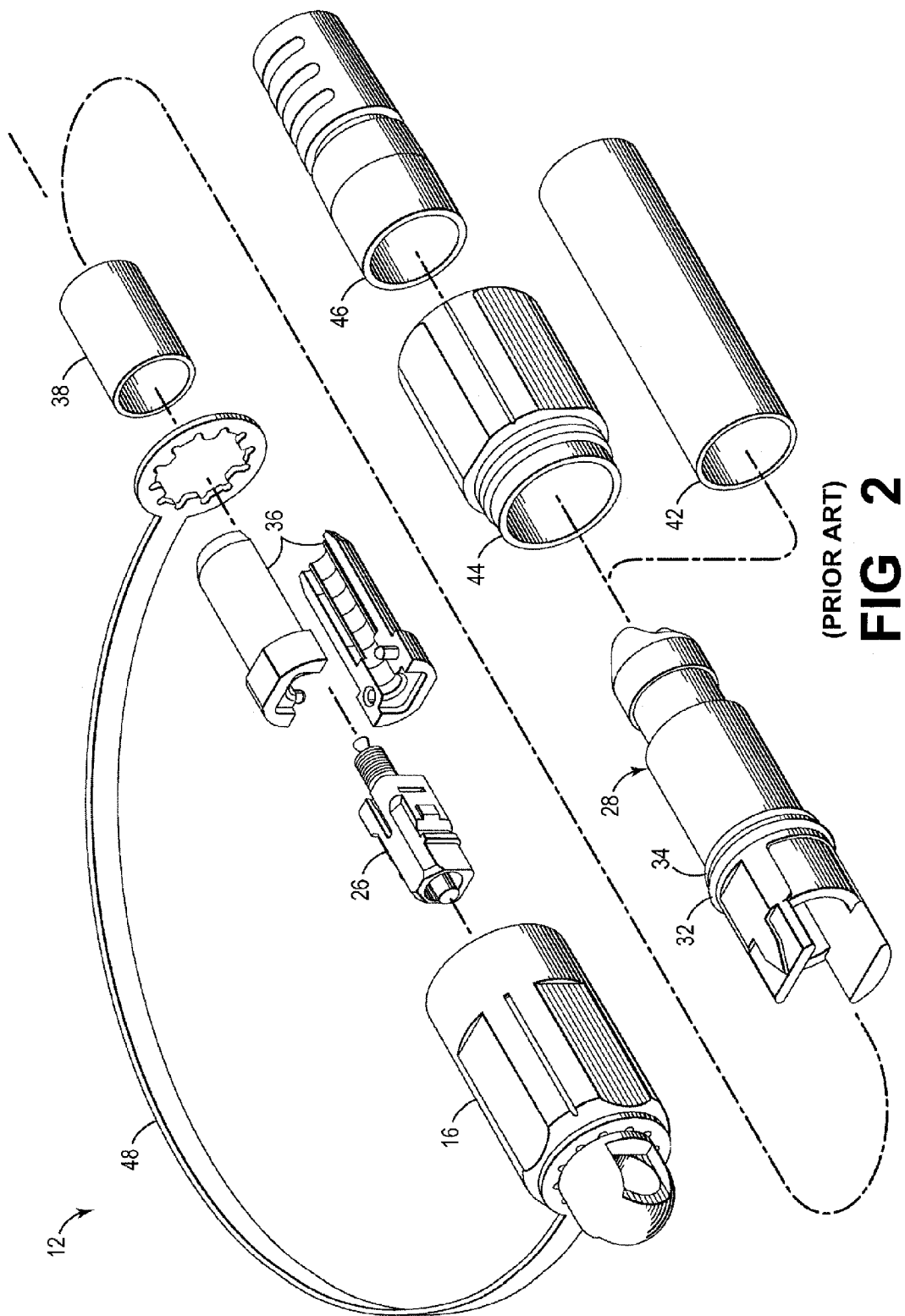
FIG. 2 is an exploded, perspective view of the conventional hardened optical connector in FIG. 1.

Referring now to FIG. 2, with continuing reference to FIG. 1, shown is an exploded, perspective view of the conventional hardened optical connector 12 in FIG. 1. The connector 12 includes an industry standard SC type connector or connector plug 26. The connector plug 26 includes a connector body having therein a ferrule (not shown) in a ferrule holder (not shown), a spring (not shown) and a spring push (not shown). The connector plug 26 is enclosed in a pronged plug housing 28, which is fitted with two O-rings 32, 34.

The connector 12 also includes a two-piece crimp body or assembly 36, which forms around the connector plug 26, and a crimp band or tube 38. The retention of the optical fiber cable within the connector 12 is achieved by sandwiching and bonding the connector plug 26 within the crimp body 36, along with the cable's strength members (not shown), and then crimping the crimp band 38 into place over the crimp body 36. The crimp body 36 then is pushed into the housing 28. The crimp body 36 is configured for securing the cable within the connector 12, once the heat shrink 42 is shrunk into place at the back of the housing 28. The heat-shrink tubing 42 also is used over an appropriate portion of the connector 12 and the cable to prevent water from entering the plug housing 28. The connector 12 also includes a coupling or coupling nut 44 for coupling the connector 12 to the adapter jack receptacle 14. The connector 12 also can include a cable boot 46, which provides strain relief. A lanyard 48 also can be used to secure the protective dust cap 16 to the connector 12.

When the connector 12 is inserted into the adapter, the O-rings 32, 34 are compressed against the relatively smooth, interior walls of the adapter to provide a water tight seal between the connector 12 and the adapter. The adapter uses an O-ring to provide a water-tight seal against a panel or enclosure wall, e.g., the wall of the fiber terminal. The coupling 44 couples the connector 12 and the adapter by screwing the threaded end of the coupling 44 into the threaded end portion of the adapter jack receptacle 14 (shown as 48 in FIG. 1).

As discussed hereinabove, although the conventional hardened connector system 10 is relatively popular, its outer diameter makes it relatively difficult to pull through many conduit used in many outside plant deployments, such as within Multi-Dwelling Unit (MDU) applications. For example, the outer diameter of the conventional hardened connector system 10 typically is approximately 0.80 of an inch. Thus, the conventional hardened connector system 10 can not be pulled through widely deployed 0.75 inch American National Standards Institute (ANSI) Schedule 40 conduit. Nor can the conventional hardened connector system 10 be inserted through many of the holes drilled in building walls, e.g., in MDU applications, since most of the drilled holes have a maximum diameter of approximately 0.50 of an inch.

Moreover, as discussed previously herein, when the conventional hardened connector system 10 is subjected to relatively excessive cable loads, e.g., due to ice build up on aerial cables, the connector 12 sometimes can separate from its corresponding adapter in such a way that permanently damages the adapters, thus requiring the entire adapter to be replaced. Also, since the adapters typically are permanently pre-installed in the fiber terminals during the manufacture of the fiber terminals (to ensure a water tight seal), the entire terminal often has to be replaced when such separation occurs.

Figure 3:
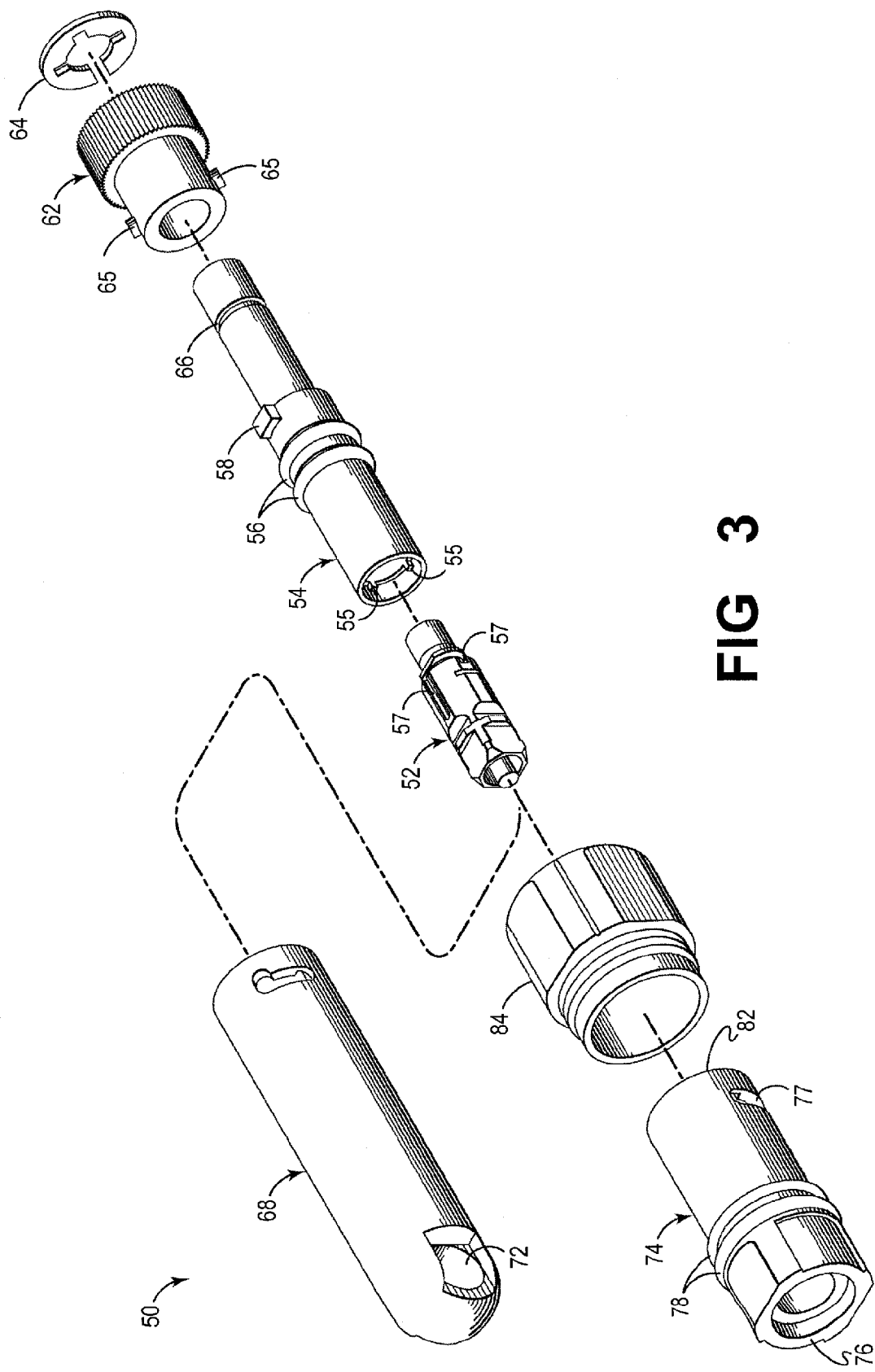
FIG. 3 is an exploded, perspective view of a hardened optical connector system according to embodiments of the invention, including the connector system translator and coupling.
Figure 4:
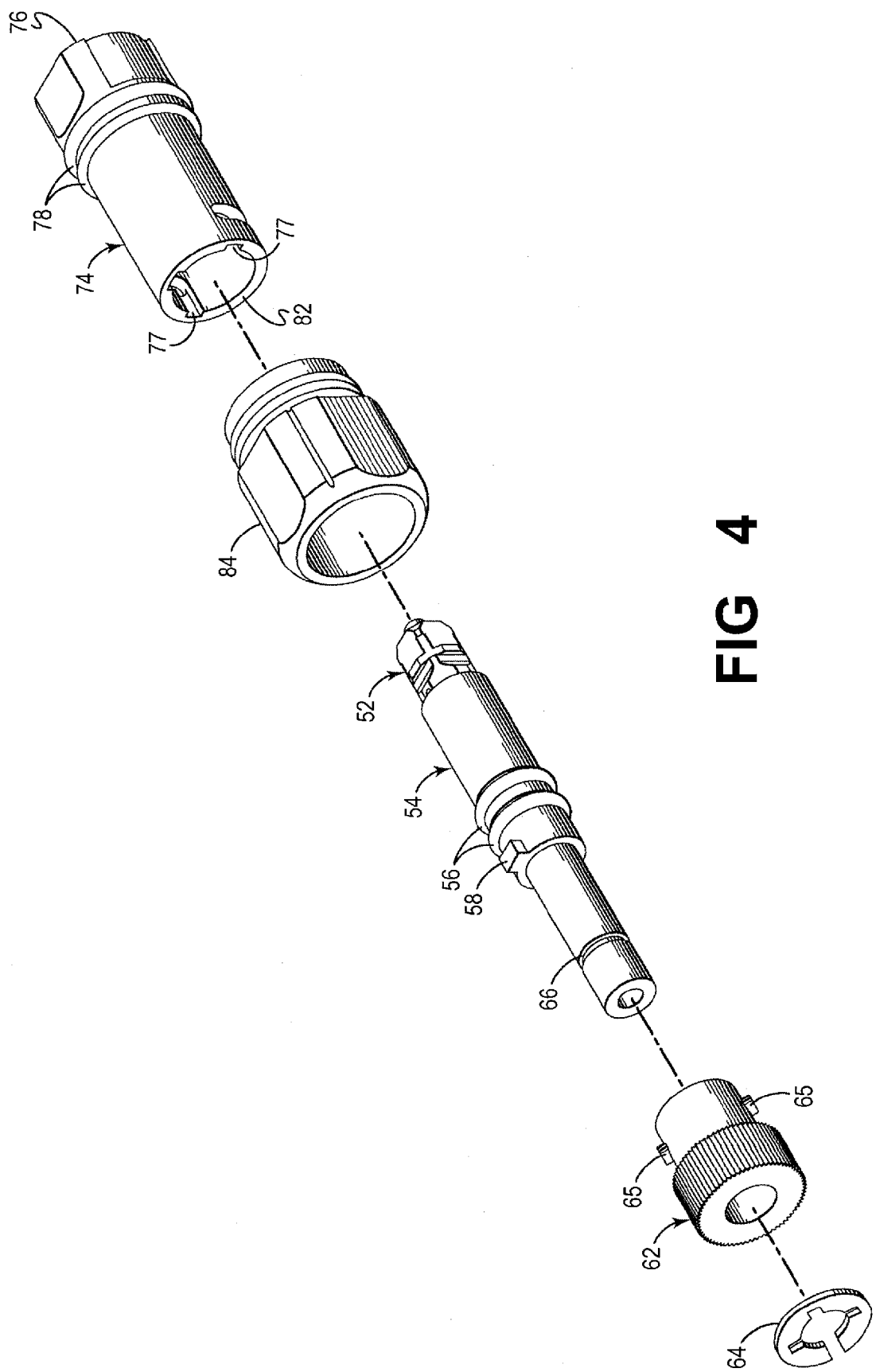
FIG. 4 is another exploded, perspective view of the hardened optical connector system according to embodiments of the invention.
Figure 5:
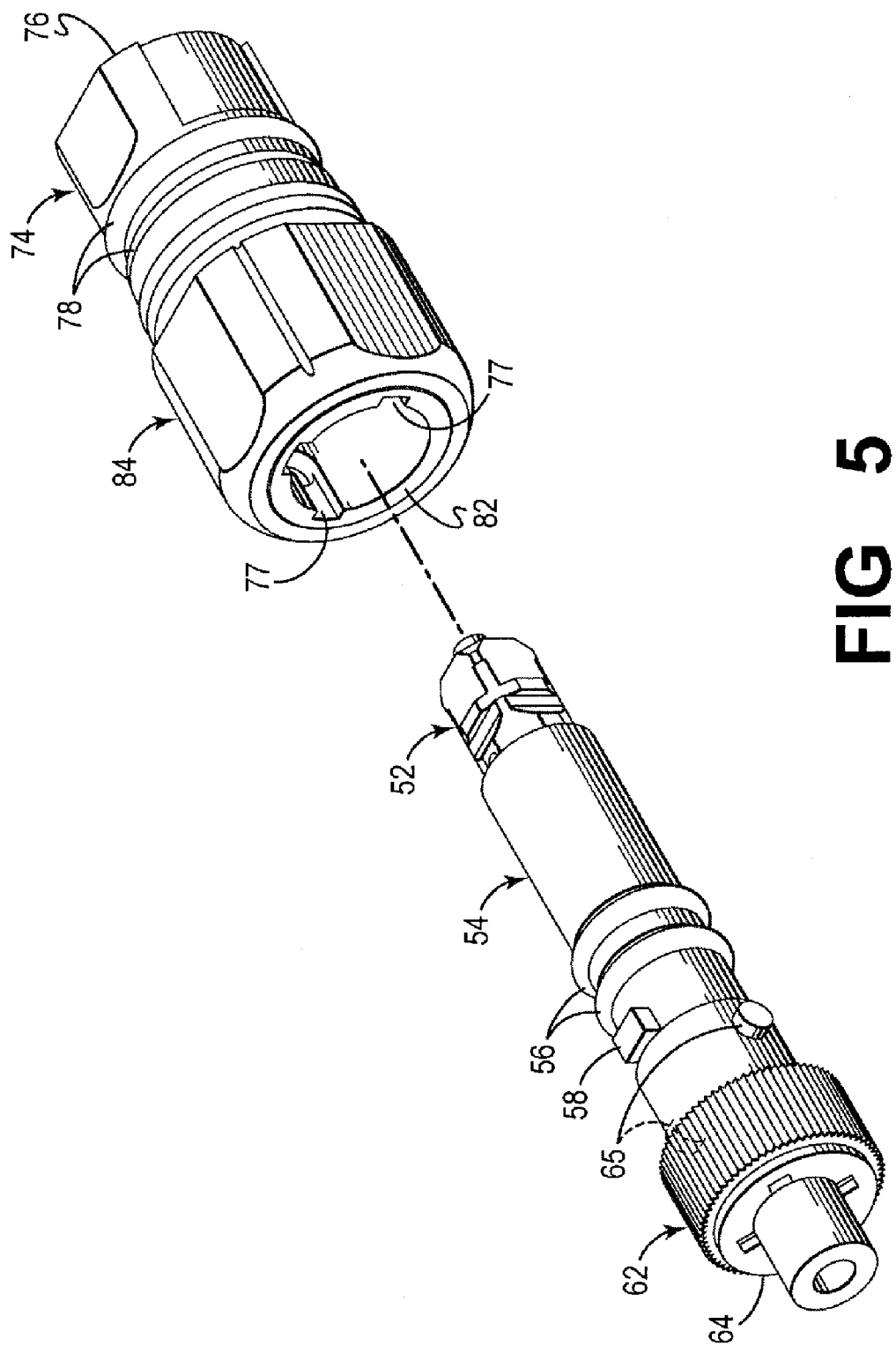
FIG. 5 is a partially exploded, perspective view of the hardened optical connector system shown in FIG. 3 and FIG. 4.

Referring now to FIGS. 3-5, shown are various exploded, perspective views of a hardened optical connector system 50 according to an embodiment of the invention. Compared to conventional hardened connector systems, such as the connector system 10 shown in FIG. 1 and FIG. 2, the hardened optical connector system 50 is smaller, relatively easier to mate with many conventional adapters, and configured to break free under excessive loads without causing damage to the adapter to which the connector system 50 is connected.

The hardened optical connector system 50 includes a connector plug 52, such as an industry standard SC type connector plug or other suitable connector plug. The connector plug 52 can include a connector body having therein a ferrule (not shown) in a ferrule holder (not shown), a spring (not shown) and a spring push (not shown). The connector plug 52 is terminated onto a single-fiber cable, e.g., in a conventional manner. However, one or more of the strength members and/or yarns (not shown) within the fiber cable can be crimped onto the connector plug 52 to improve or strengthen the termination of the connector plug 52 to the cable.

The connector system 50 also includes a single-piece, unipartite plug housing 54, which is dimensioned to receive an end portion of the optical fiber cable and at least a portion of the connector plug 52. The connector plug 52 is inserted into and bonded with the plug housing 54. The plug housing 54 can be made of plastic or other suitable material or materials, such as aluminum or brass. Unlike the conventional plug housing 28 shown in FIG. 2, the plug housing 54 in the connector system 50 does not include any prongs or other relatively bulky, external guiding elements for guidably inserting the plug housing into the receptacle portion of an adapter. Thus, the plug housing 54 in the connector system 50 is smaller than conventional connector plug housings and the outer diameter of the plug housing 54 is less than the outer diameter of conventional connector plug housings.

The plug housing 54 uses one or more O-rings 56 to provide water resistance, as will be discussed in greater detail hereinbelow. The plug housing 54 can be configured to include one or more keys or other alignment indicia 58 for proper insertion orientation of the plug housing 54. The plug housing 54 also can include one or more internal keys 55 or other alignment indicia (not shown), which mate with complementary keyways 57 on the connector plug 52 to allow 4-position orientation of the connector plug 52 relative to the plug housing 54. These keying features also facilitate connector tuning and proper orientation of angled-polished connector end faces, when such connectors are used.

The connector system 50 also includes a coupling nut 62. The coupling nut 62 is installed over the plug housing 54 and held into place using a slit retainer washer 64 or other suitable component or means. The slit retainer washer 64 holds the coupling nut 62 into place by seating into a groove 66 formed in the exterior surface of the plug housing 54. However, the coupling nut 62 is free to rotate relative to the plug housing 54. As will be discussed in greater detail hereinbelow, the coupling nut 62 can include bayonet-style coupling pins 65 or other suitable components or configuration for securing the coupling nut 62 (and the plug housing 54) to an adapter.

The connector system 50 also can include a removable, protective dust cap 68 that is configured to fit over the connector plug 52 and at least a portion of the plug housing 54. The dust cap 68 can be configured with a pulling eye 72 to facilitate pulling cables terminated with the connector system 50 through conduit. The removable dust cap 68 can be secured to the connector system 50 using a lanyard (not shown) or via other suitable means.

The connector system 50 can also include heat-shrink tubing (not shown) to prevent water from entering the plug housing 54. The heat-shrink tubing can be lined with adhesive and installed over the rear portion of the plug housing 54 and an appropriate portion of the cable that is coupled to the plug housing 54. Also, an elastomeric boot (not shown) can be bonded in place over the heat-shrink tubing to provide strain relief for the cable. For example, the boot can be bonded over the heat shrink tubing just behind the retainer washer 64.

The connector system 50 includes a translator 74 to provide compatibility between the connector plug housing 54 (and the connector plug 52) and other connectors and their adapters, including conventional hardened connectors and their corresponding adapters. The translator 74 includes a first or front end 76, which is configured to couple the translator 74 to a jack receptacle portion of a conventional connector system adapter (not shown). The front end 76 of the translator 74 is dimensioned appropriately to fit relatively snugly within a conventional adapter jack receptacle. The front end 76 of the translator 74 typically includes one or more O-rings 78 to provide water resistance.

The translator 74 also includes a second or rear end 82, which is configured to insert the translator 74 into or otherwise couple the translator 74 to a translator coupling 84 or other suitable component or components for coupling the translator to the conventional hardened adapter jack receptacle 14. The second end 82 of the translator 74 has a relatively smooth external surface that is dimensioned appropriately to fit within the internal wall of the translator coupling 84. The rear end 82 of the translator 74 typically includes one or more bayonet slots 77 or other suitable means for coupling the translator 74 to the connector plug housing 54 and the coupling nut 62. The body of the translator 74 typically is configured as a relatively smooth bore that runs down the length of the translator 74, i.e., between the first end 76 and the second end 82.

The translator 74 is coupled to the jack receptacle of a connector adapter by screwing or otherwise securing the coupling 84 to the jack receptacle portion of the connector adapter. When the translator 74 is coupled to the connector adapter, the O-rings 78 are compressed against the internal wall of the connector adapter, providing a water-tight seal between the translator 74 and the adapter. To help an installer know when proper installation/coupling of the translator 74 to a connector adapter is complete, the first end of the translator 74 can include a bright ring or other visible indicia formed around the outer diameter of the second end 82 of the translator 74. The translator coupling 84 is dimensioned and configured in such a way that, when the translator coupling 84 is positioned around the body of the translator 74 and screwed into or otherwise secured to the connector adapter, the second end 82 of the translator 74 protrudes beyond the translator coupling 84. In this manner, the bright ring around the second end 82 of the translator 74 will become visible to the installer, letting the installer know that the translator 74 and the translator coupling 84 have been properly seated to the connector adapter. When this approach is employed, the bright ring will not be visible to the installer if the translator 74 and the translator coupling 84 are not properly coupled or seated to the connector adapter.

With the first end 76 of the translator 74 coupled to the adapter, the connector can be coupled to the second end 82 of the translator 74 by first aligning the key 58 on the plug housing 54 with a complementary keyway portion formed in the second end 82 of the translator, and inserting the plug housing slightly into the second end of the translator 74. Next, the coupling nut 62 is rotated clockwise until the coupling pins 65 on the coupling nut 62 align with the remaining keyways, e.g., the bayonet slots 77 formed in the second end 82 of the translator 74. The connector is pushed forward into the translator until the coupling pins 65 on the coupling nut 62 bottom in the bayonet slots 77. The coupling nut 62 then is rotated until the coupling nut 62 can no longer be rotated. The connector then is released and a spring within the adapter forces the coupling pins 65 to rest at the ends of the bayonet slots 77. Such coupling is similar to coupling of BNC-style video cables and ST fiber-optic connectors. It should be understood that other suitable coupling configurations can be used to couple the connector to the translator 74.

As the connector is being coupled to the translator 74, the two O-rings 56 on the plug housing 54 are compressed against the inner wall of the body of the translator 74 to provide a water-tight seal. Alternatively, the inner wall of the body of the translator 74 can be configured to include a ledge, and a rubber gasket can be inserted into the body of the translator 74. As the plug housing is coupled to the translator 74, the rubber gasket is compressed between the front edge of the plug housing 54 and the ledge within the body of the translator 74. Also, alternatively, a rubber gasket can be positioned between the second end of the translator 74 and the flange portion of the coupling nut 62.

The translator 74 provides a secure and effective coupling instrument for coupling the connector, e.g., the plug 52 and the plug housing 54, to a connector adapter, such as a hardened connector adapter pre-installed in a fiber terminal. However, the translator 74 also allows the plug housing 54 to separate from the adapter, via fracture of the translator 74, e.g., when excessive loads are placed on the cable. In this manner, the connector can separate from the adapter without damaging the adapter, unlike conventional hardened connector/adapter configurations. When this separation occurs, the translator 74 can be replaced easily.

The protective dust cap 68 can have the same keyway configuration as the translator 74. In this manner, the plug 52 and at least a portion of the plug housing 54 can be inserted into the protective dust cap 68 in the same manner that the plug 52 and the plug housing 54 are inserted into and coupled with the translator 74.

The configuration of the connector system 50 is such that the outer diameter of the plug housing 54, with the protective dust cap 68 inserted thereon, is less than the outer diameter of conventional hardened connectors. For example, the outer diameter of the plug housing 54, with the protective dust cap

68, is less than 0.50 of an inch. Accordingly, as discussed hereinabove, the connector system 50 can be pulled through Schedule 40 (0.75 inch) conduit, e.g., using the pulling eye 72. Also, for example, the connector system 50 can be inserted through 0.50 inch holes drilled into an end user residence, e.g., for deploying the connector system 50 in Multi-Dwelling Unit (MDU) applications.

The connector system 50 is configured to be deployed within many cables and cable configurations. For example, the connector system 50 is particularly well suited to be deployed in cables with 900 micron fiber and aramid yarn, including polyaramid yarn. The aramid yarn provides an installer or cable manufacturer with something to crimp to and is waterswellable. The 900 micron fiber is compatible with many existing connector components.

With respect to buffering within cables that house the connector system 50, in general, it is beneficial for the buffering to be relatively tight and relatively stiff. In such case, when the connectorized cable is put under strain, a relatively stiff buffer can slide back into the cable jacket to relieve strain, while a relatively flexible (non-stiff) buffer could buckle and damage the fiber. Relatively stiff buffer material can be made of any suitable material or materials, such as a dual layer nylon/polyolefin buffer. Alternatively, relatively stiff buffer material can be made of straight nylon, Hytrel polyester, and other similar compounds.

It will be apparent to those skilled in the art that many changes and substitutions can be made to the embodiments of the invention herein described without departing from the spirit and scope of the invention as defined by the appended claims and their full scope of equivalents.

The invention claimed is:

1. A connector system for use with a cable having at least one optical fiber therein, the connector system comprising:
   a connector plug configured for terminating an optical fiber;
   a plug housing configured to receive therein at least a portion of a first end of the cable and at least a portion of the connector plug therein;
   a translator configured to couple the plug housing and the connector plug to an optical fiber connector adapter; and
   a coupling nut configured to couple the plug housing to the translator in such a way that, when the translator is coupled to a jack receptacle portion of the optical fiber connector adapter, the connector plug is operably positioned within the optical fiber connector adapter, wherein the translator is configured to couple to the jack receptacle portion of the optical fiber connector adapter by a translator coupling in such a way that the connector plug coupled to the translator is operably positioned within the optical fiber connector adapter, and wherein the translator is configured to couple the plug housing and the connector plug to the optical fiber connector adapter in such a way that when a tensile load is applied to the cable that is sufficient to decouple the connector plug and the plug housing from the optical fiber connector adapter, the translator decouples the connector plug and the plug housing from the optical fiber connector adapter without the translator coupling damaging the adapter.

2. The system as recited in claim 1, further comprising a dust cap configured to be positioned over at least a portion of the plug housing connector in such a way that the dust cap protects the connector plug.

3. The system as recited in claim 1, wherein the connector system further comprises a retainer configured to couple the coupling nut to the plug housing in such a way that the coupling nut can rotate axially relative to the plug housing.

4. The system as recited in claim 1, further comprising a coupling configured to couple the translator to the jack receptacle portion of the optical fiber connector adapter.

5. The system as recited in claim 1, wherein the connector system is dimensioned and configured in such a way that the connector system can be passed through a 90° bend in a conduit having an inner diameter of approximately 0.75 of an inch.

6. The system as recited in claim 1, wherein the connector plug is an SC connector plug.

7. A cable assembly including the connector system of claim 1, wherein the at least one optical fiber is a buffered optical fiber having a first end passing through the plug housing and terminated by the connector plug, and wherein the buffered optical fiber includes at least one strand aramid yarn crimped to the connector plug.

8. The system as recited in claim 1, wherein the plug housing includes an interior surface having at least one keying feature coupled thereto, and wherein the connector plug includes at least one keyway feature formed therein that corresponds to the keying feature when the connector plug is operably positioned within the plug housing.

9. The system as recited in claim 1, further comprising at least one O-ring formed around the plug housing to prevent water from entering the translator when the plug housing is coupled to the translator.

10. An apparatus, which couples a connector terminating an optical fiber therein to an optical fiber connector adapter, wherein the connector includes a connector plug terminating the optical fiber therein and a connector plug housing having the connector plug received therein, comprising:
    a translator for use with a translator coupling having:
        a first end configured to couple to the connector; and
        a second end configured to couple to the optical fiber connector adapter, and
    a coupling nut configured to couple the plug housing to the translator in such a way that, when the translator is coupled to a jack receptacle portion of the optical fiber connector adapter, the connector plug is operably positioned within the optical fiber connector adapter, wherein the translator is configured to couple the connector to the connector adapter in such a way that, when a cable tensile load sufficient to decouple the connector from the connector adapter is placed on the connector, the translator decouples the connector from the connector adapter without the translator coupling damaging the adapter.

11. The apparatus as recited in claim 10, further comprising at least one O-ring formed around the translator to prevent water from entering the adapter and the translator when the connector is coupled to the translator.

12. The apparatus as recited in claim 10, further comprising a coupling configured to couple the translator to the jack receptacle portion of the optical fiber connector adapter.

* * * * *